Oct. 25, 1966   N. M. POTTER ET AL   3,281,639

BATTERY CHARGER

Filed June 7, 1963   2 Sheets-Sheet 1

INVENTORS
NORMAN M. POTTER
DEWEY L. GREER
GEORGE F. BILTZ

BY John R. Doherty
ATTORNEY

INVENTORS
NORMAN M. POTTER
DEWEY L. GREER
GEORGE F. BILTZ

BY John R. Wickerty
ATTORNEY 3,281,639
BATTERY CHARGER
Norman M. Potter, Rocky River, Dewey L. Greer, Cleveland, and George F. Biltz, Lakewood, Ohio, assignors to Union Carbide Corporation, a corporation of New York
Filed June 7, 1963, Ser. No. 286,336
2 Claims. (Cl. 320—43)

This invention relates to battery chargers, and more particularly to novel and improved circuit arrangements for charging a secondary or rechargeable battery characterized in that its on-charge voltage does not become constant prior to the battery reaching the charged condition. Illustrative battery systems of this character include alkaline $MnO_2$, lead acid and silver-cadmium batteries, for instance.

A common technique for charging a battery of the above-indicated character is through the use of a tapered current charger. Battery chargers of this type commonly operate from an input voltage to the rectifier that is slightly higher than the voltage of the battery when fully charged. In practice, the charging current decreases from its maximum, when the battery is fully discharged, to essentially zero as it approaches the charged condition.

One problem encountered in the use of tapered current chargers is that large variations in the charging current, due to small changes in the line voltage, often occur when the battery is being charged. Unfortunately, these variations in the charging current cannot be controlled, and when they occur, it is difficult, if not impossible, to ascertain the amount of charge delivered to the battery over the charge period.

In an effort to overcome this problem, battery chargers that are capable of supplying the charging current at two different rates, i.e., a high and low rate, are frequently used. These chargers usually are designed to provide a constant charging current at each rate. The high charging current is supplied to the battery during the initial portion of the charge period and the charger is then switched to the lower rate as the battery approaches the fully charged condition. Ordinarily, the switching of the charge rates is accomplished by a manual or time controlled switch. As will be apparent, the disadvantage of these chargers is that the operator is generally required to know the initial state of charge of the battery so that only the required amount of energy is restored to bring the battery to the fully charged condition and to prevent excessive overcharge of the battery.

It is a general object of the invention to provide an improved battery charger of the tapered current type.

Another object of the invention is to provide an improved battery charger that is capable of supplying a tapered charging current to the battery under charge, which charging current restores most of the battery capacity during the earlier portion of the charge period.

Still another object of the invention is to provide an improved battery charger that is capable of avoiding large variations in the charging current, due to small changes in the line voltage, without the aid of switching circuitry or devices.

A further object of the invention is to provide an improved battery charger that actually "senses" the state of charge of the battery and that is capable of restoring only the required amount of energy necessary to bring the battery to a condition of full charge.

Other objects and advantages of the invention will become apparent from the following description, taken in conjunction with the accompanying drawings, wherein.

Figure 1:
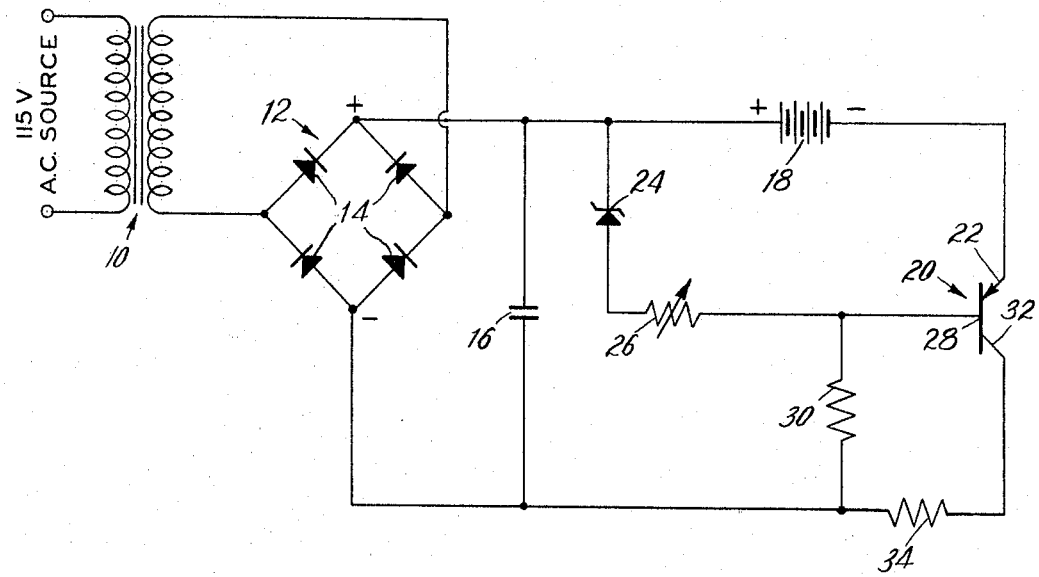
FIGURE 1 is a circuit diagram illustrating one type of battery charger of the prior art.

In accordance with the invention, there is provided a battery charger comprising the combination of a transistor for controlling the amount of charging current delivered to the battery under charge and a reference voltage device to which the voltage of the battery is compared. Specifically, the reference voltage device may be a Zener diode having a fixed voltage that is equal to or less than the voltage of the battery in the charged condition. In operation, the battery voltage or selected portion thereof is compared to the reference voltage and the difference used as a means to forward bias the transistor and to decrease or taper the charging current toward zero as the battery voltage rises during the charge period.

Simply defined, a Zener diode is a solid state device characterized in that when operated in its reverse voltage breakdown region, it exhibits a substantially constant voltage for large current variations. In the several circuits of the invention to be described, the Zener diode is operated in its breakdown voltage region and serves to provide a practical source of constant or fixed reference voltage. For a more detailed description of a Zener diode and its characteristics, reference is made to the 1960 edition of "Zener Diode Handbook," published by the International Rectifier Corporation.

In one embodiment of the invention, a pair of transistors are utilized to control the charging current to the battery. The Zener diode is connected in the emitter-base path of the first of these transistors. The charging current is fed to the battery through the emitter and collector of the second transistor. In operation, a relatively small current is passed from the base of the second transistor through the collector and emitter of the first transistor and to the adjustable tap of a potentiometer which is connected across the terminals of the battery. As will be hereinafter described, the function of the second transistor is to amplify the current fed through the first transistor and to control the amount of charging current delivered to the battery.

Although a Zener diode is preferred, it should be understood that almost any fixed reference voltage device may be used in the practice of the invention. For example, it is entirely possible to employ a primary or secondary battery, a voltage reference tube or a gas discharge tube. For the sake of conciseness, the invention will be described in greater detail by reference to circuits employing a Zener diode as the fixed reference voltage device.

Referring now to the drawings, the battery charger of the invention may be supplied with direct current from a convenient source of alternating current, such as a 115-volt A.C. source, through a transformer 10 having its primary connected across the alternating current source and its secondary connected across a full-wave rectifier bridge generally indicated by the reference numeral 12. The rectifier bridge 12 may be composed of four rectifier diodes 14 so arranged as to give a full-wave rectified current. A capacitor 16 may be connected across the positive and negative of the bridge rectifier 12 to provide a partially filtered, direct current voltage to the circuit.

As illustrated in FIGURE 1, the battery to be charged, indicated at 18, is shown placed into a known charging circuit comprising a transistor 20 which may be of the p-n-p type. The transistor 20 is connected at its emitter 22 to the negative terminal of the battery. A Zener diode 24 and a variable resistance 26 are provided between the base 28 of the transistor 20 and the positive terminal of the battery. A resistance 30 is connected from the base 28 of the transistor 20 to the negative of the bridge rectifier 12 in order to provide a path for the base current and the current through the Zener diode 24 and variable resistance 26.

Ideally, the voltage of the Zener diode 24 in the circuit of FIGURE 1 should be equal to the voltage of the battery in the fully charged condition. However, in actual practice, the Zener diode voltage may be somewhat less than the voltage of the fully charged battery due to diode manufacturing tolerances. To compensate for the difference in voltage, the variable resistance 26 may be adjusted to give the desired fixed reference voltage in the circuit.

In operation of the circuit of FIGURE 1, the charging current is fed to the battery from the bridge rectifier 12 and through the emitter 22 and the collector 32 of the transistor 20. To establish the fixed reference voltage, a current is fed through the Zener diode 24 and variable resistance 26 via the resistance 30. The on-charge voltage of the battery is then compared to the fixed reference voltage and the difference used to forward bias the transistor 20. When the battery is first placed on charge, this difference is relatively large since the battery voltage is low, and the transistor 20 is biased to conduct a large amount of charging current from the bridge rectifier 12 to the battery. To limit the charging current when the battery voltage is low, a resistance 34 may be connected in series with the collector 32 of the transistor 20. As the battery becomes charged, the battery voltage increases and the voltage difference between the reference voltage and the battery is gradually reduced until the total voltage drop in the emitter-base portion of the circuit is substantially zero. At this point, the transistor 20 is no longer biased to conduct any current to the battery. Thus it will be observed that the charging current is gradually decreased or tapered to essentially zero when the battery is fully charged.

The circuit of FIGURE 1 is characterized in that a variable resistance 26 is connected in series with the Zener diode 24. As indicated above, the variable resistance 26 provides a means for adjusting the fixed reference voltage in the circuit. Although this arrangement is entirely satisfactory in those cases where the line voltage across the primary of the transformer 10 can be kept relatively constant, it will be noted that when a change in the line voltage occurs, the current flowing through the variable resistance 26 will vary and produce a change in the reference voltage. It is entirely possible to construct a circuit in accordance with the invention having equivalent means for making the required adjustments to compensate for the voltage tolerances of the Zener diode, but which is further characterized in that line voltage changes will not substantially affect the reference voltage in the circuit. Such a circuit is illustrated in the embodiment of FIGURE 2.

Figure 2:
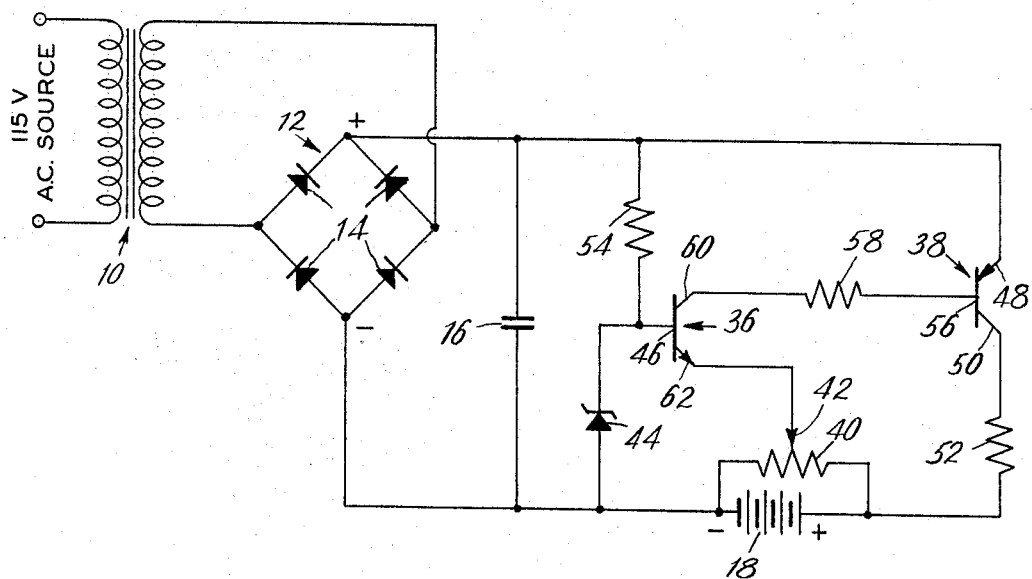
FIGURE 2 is a diagram illustrating one embodiment of the invention.

In the circuit of FIGURE 2, a pair of transistors 36 and 38 are utilized to control the charging current to the battery and a potentiometer 40 having an adjustable tap 42 is connected across the terminals of the battery. The Zener diode 44 is connected between the negative terminal of the battery and the base 46 of the first transistor 36. The transistor 36 is suitably of the n-p-n type. In operation, the charging current is fed to the battery from the bridge rectifier 12 through the emitter 48 and collector 50 of the second transistor 38 and through a resistance 52. The resistance 52 limits the charging current at low battery voltages. To establish the fixed reference voltage, a current is fed through the Zener diode 44 via a resistance 54 which is connected from the positive terminal of the bridge rectifier 12 to the base 46 of the first transistor 36. The tap 42 of the potentiometer 40 is adjusted so that a "sample voltage," appearing across the left side of the potentiometer, is essentially equal to the voltage of the Zener diode 44 when the battery is fully charged. With this adjustment made, the difference between the reference voltage of the Zener diode 44 and the sample voltage is used to forward bias the first transistor 36 causing it to conduct a current which flows from the base 56 of the second transistor 38. This current passes through a resistance 58 to the collector 60 of the first transistor 36 and thence through the emitter 62 to the adjustable tap 42 of the potentiometer 40. The function of the resistance 58 is to limit the power dissipation in the transistor 36. In this arrangement of the transistors 36 and 38, the current fed through the first transistor 36, which actually constitutes the control current for determining the amount of charging current to the battery, is amplified by the second transistor 38. The charging current fed through the second transistor 38 is gradually reduced, in response to the decreasing voltage difference between the Zener diode 44 and the sample voltage across the potentiometer 40, from an initially large value to essentially zero when the battery is fully charged as is accomplished in the circuit of FIGURE 1. However, it will be noted that since the potentiometer 40, which is used to adjust for the voltage tolerances of the Zener diode 44, is connected across the terminals of the battery, any change in the line voltage across the primary of the transformer 10 will not affect the fixed reference voltage of the Zener diode 44 in the circuit.

Figure 3:
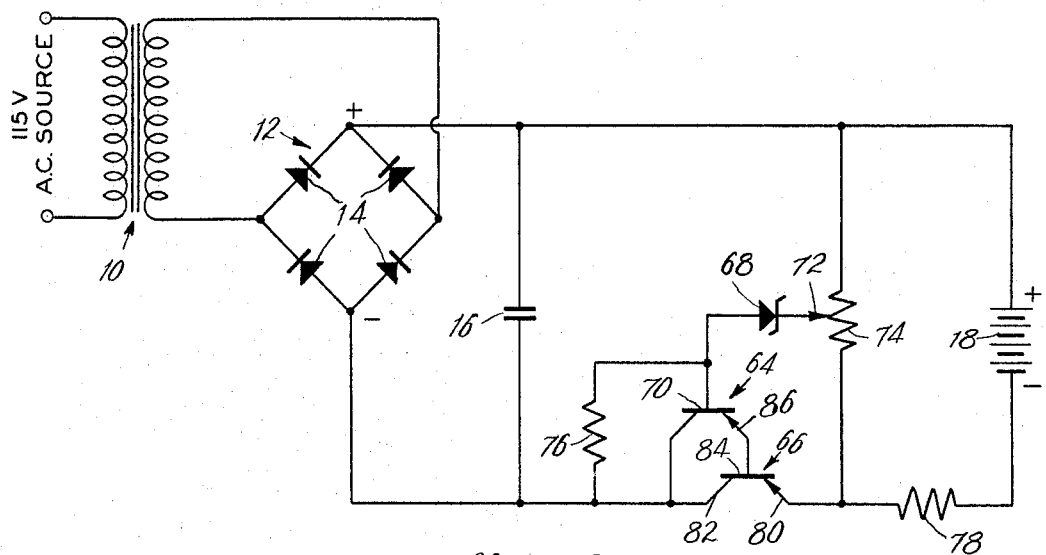
FIGURE 3 is similar illustrating another embodiment of the invention.

A modification of the above-described circuit is illustrated in FIGURE 3. In this modification, the pair of transistors 64 and 66 utilized to control the charging current to the battery are connected as shown in a cascade (Darlington) arrangement. The Zener diode 68 is connected in series between the base 70 of the first transistor 64 and the adjustable tap 72 of the potentiometer 74. A resistance 76 is connected from the negative of the bridge rectifier 12 to the base 70 of the first transistor 64 in order to provide a path for the base current and the current through the Zener diode 68. The operation of the circuit is substantially the same as that of FIGURE 2, i.e., the tap 72 of the potentiometer 74 is adjusted so that the "sample voltage," appearing across the lower end of the potentiometer, is essentially equal to the voltage of the Zener diode 68 when the battery is fully charged. The charging current is fed from the bridge rectifier 12 to the battery, through the limiting resistance 78 and then through the emitter 80 and the collector 82 of the second transistor 66. The transistor 66 again serves to amplify the current fed from its base 84 to the emitter 86 of the first transistor 64.

An outstanding feature of the invention resides in the ability of the battery charger to "sense" the state of charge of the battery and to deliver only that amount of energy necessary to bring the battery to the fully charged condition. This feature is made possible by the provision of the fixed reference voltage device, such as the Zener diode, through means of which the charging current is made a function of the battery voltage and is decreased or tapered toward zero during the charge period. Since there is little if any change of overcharging the battery, there is no need for the operator to determine the initial state of charge of the battery.

As an illustration of the invention, a battery charger substantially identical to the circuit of FIGURE 2 was used to charge an alkaline $MnO_2$ battery to a fully charged voltage of 17.5 volts. The circuit was designed for a maximum charging current of about 1 ampere and was constructed utilizing the following components:

| Component | Value |
|---|---|
| Zener diode 44 | ¼ M12Z manufactured by Motorola. |
| Transistor 36 | 2N1304 manufactured by Texas Instruments. |
| Transistor 38 | 2N307 manufactured by Sylvania. |
| Potentiometer 40 | 500 ohm, 1 watt. |
| Capacitance 16 | 250 microfarads, 50 volt D.C. |
| Resistance 52 | 5 ohms, 5 watt. |
| Resistance 54 | 4700 ohms, ½ watt. |
| Resistance 58 | 400 ohms, ½ watt. |

Figure 4:
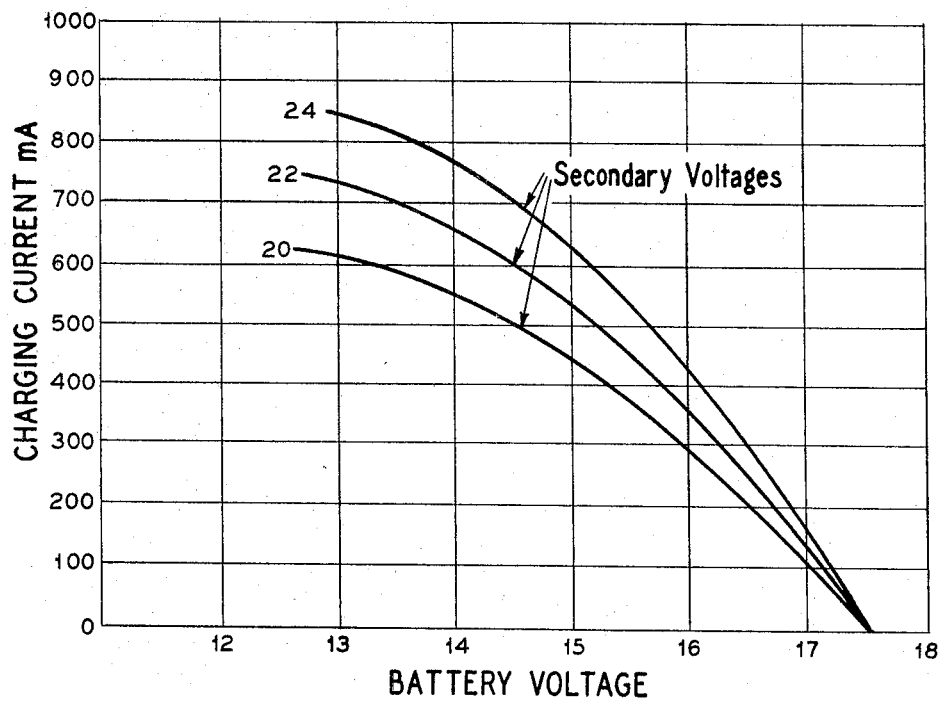
FIGURE 4 is a graph illustrating the performance of the battery charger of FIGURE 2.

In the test, the battery charger was operated from a transformer secondary voltage of 22 volts which was varied ±2 volts in order to determine the effect of line voltage change on the charging current to the battery. The results of the test are illustrated in the graph of FIGURE 4. From the graph, it will be noted that the charging current reached a maximum value of nearly 800 milliamperes when the battery was first placed on charge and then decreased or tapered toward zero as the battery voltage increased and the battery approached the fully charged condition. When the secondary voltage of the transformer was varied, a slight variation in the charging current was observed. At low battery voltages, the current variation was a maximum of about 100 milliamperes or 10 percent of the initial charging current for the same percentage change in the secondary voltage of the transformer. This represents a significant improvement as compared to prior battery chargers of the tapered current type wherein the charging current varied up to 50 percent when the line voltage or transformer secondary voltage was varied only 10 percent. Of course, it should be noted that although the charging current in the present battery charger did vary at low battery voltages, this variation gradually diminished and became negligible as the battery approached the fully charged condition. Because battery voltage is related to the state of charge, it can be further seen from the graph of FIGURE 4 that a substantial portion of the battery capacity was restored during the early portion of the charge period.

From the above, it will be seen that the invention provides a novel and improved battery charger comprising a transistor for controlling the charging current to the battery under charge and a reference voltage device to which the voltage of the battery is compared during the charge period. It will be understood that the battery charger of the invention may be supplied with direct current through a number of transformer-rectifier arrangements or that any suitable direct current source, such as a motor-generator or large storage battery, may be used.

We claim:

1. A battery charger comprising, in combination, a direct current source in series with the battery under charge; a potentiometer having an adjustable tap connected across said battery; a first transistor having a base, collector and an emitter which is connected in series with said adjustable tap of said potentiometer; a second transistor having a base, collector and an emitter; means for connecting said battery in the emitter-collector path of said second transistor and for connecting the base of said second transistor to the collector of said first transistor; and a Zener diode connected between the base of said first transistor and said battery in the emitter-base path of said first transistor, the characteristics of said Zener diode being such that it continuously conducts current throughout the charge period to provide a fixed voltage which is equal to the voltage of said battery or sample thereof in the charged condition.

2. A battery charger comprising, in combination, a direct current source in series with the battery under charge; a potentiometer having an adjustable tap connected across said battery; a first and second transistor having a base, collector and emitter; means for connecting the emitter of said first transistor to the base of said second transistor and for connecting the collector of said first transistor to the collector of said second transistor; and a Zener diode connected between the base of said first transistor and said adjustable tap of said potentiometer in the emitter-base path of said first and second transistor, the characteristics of said Zener diode being such that it continuously conducts current throughout the charge period to provide a fixed voltage which is equal to the voltage of said battery or sample thereof in the charged condition.

References Cited by the Examiner

UNITED STATES PATENTS

| | | | |
|---|---|---|---|
| 2,903,640 | 9/1959 | Bixby | 321—19 |
| 2,978,633 | 4/1961 | Medlar | 323—89 |
| 3,123,759 | 3/1964 | Grey | 320—40 |
| 3,179,871 | 4/1965 | Bagno | 320—30 |

JOHN F. COUCH, *Primary Examiner.*

LLOYD McCOLLUM, MILTON O. HIRSHFIELD,
*Examiners.*

S. WEINBERG, *Assistant Examiner.*